(12) United States Patent
Jandhyala et al.

(10) Patent No.: US 7,933,944 B2
(45) Date of Patent: Apr. 26, 2011

(54) COMBINED FAST MULTIPOLE-QR COMPRESSION TECHNIQUE FOR SOLVING ELECTRICALLY SMALL TO LARGE STRUCTURES FOR BROADBAND APPLICATIONS

(75) Inventors: Vikram Jandhyala, Seattle, WA (US); Indranil Chowdhury, Seattle, WA (US)

(73) Assignee: University of Washington, Seattle, WA (US)

( * ) Notice: Subject to any disclaimer, the term of this patent is extended or adjusted under 35 U.S.C. 154(b) by 952 days.

(21) Appl. No.: 11/778,369

(22) Filed: Jul. 16, 2007

(65) Prior Publication Data

US 2008/0027689 A1 Jan. 31, 2008

Related U.S. Application Data

(60) Provisional application No. 60/807,462, filed on Jul. 14, 2006.

(51) Int. Cl.
*G06F 7/38* (2006.01)
(52) U.S. Cl. ...................................................... 708/446
(58) Field of Classification Search .................... 708/446
See application file for complete search history.

(56) References Cited

U.S. PATENT DOCUMENTS

| | | | | |
|---|---|---|---|---|
| 5,189,633 A * | 2/1993 | Bonadio | ...................... | 708/142 |
| 5,717,621 A * | 2/1998 | Gupta et al. | .................. | 708/446 |
| 6,732,064 B1 * | 5/2004 | Kadtke et al. | .................. | 702/189 |
| 6,970,560 B1 * | 11/2005 | Hench et al. | .................... | 379/417 |
| 7,147,666 B1 | 12/2006 | Tsang et al. | ...................... | 703/2 |
| 7,295,137 B2 * | 11/2007 | Liu et al. | ........................... | 341/51 |
| 7,356,791 B2 | 4/2008 | Rautio | ............................... | 716/5 |
| 7,475,102 B2 * | 1/2009 | Nagahara | ...................... | 708/250 |
| 2005/0102343 A1 * | 5/2005 | Tsang et al. | ................... | 708/446 |
| 2006/0200724 A1 * | 9/2006 | Stankovic et al. | ............ | 714/758 |

OTHER PUBLICATIONS

Ling et al., "Large-scale broadband parasitic extraction for fast layout verification of 3D RF and mixed-signal on-chip structures," IEE MTT-S Int. Microwave Symp. Dig. Fort Worth, TX, pp. 1399-1402, Jun. 2004.
Tang et al., K. A Statistical Model of Wave Scattering from Random Rough Surfaces, Sciencedirect, International Journal of Heat and Mass Transfer, vol. 44, Iss. 21, Nov. 2001, pp.4059-4073.*

* cited by examiner

*Primary Examiner* — Tan V Mai
(74) *Attorney, Agent, or Firm* — Ronald M. Anderson

(57) ABSTRACT

An approach that efficiently solves for a desired parameter of a system or device that can include both electrically large fast multipole method (FMM) elements, and electrically small QR elements. The system or device is setup as an oct-tree structure that can include regions of both the FMM type and the QR type. An iterative solver is then used to determine a first matrix vector product for any electrically large elements, and a second matrix vector product for any electrically small elements that are included in the structure. These matrix vector products for the electrically large elements and the electrically small elements are combined, and a net delta for a combination of the matrix vector products is determined. The iteration continues until a net delta is obtained that is within predefined limits. The matrix vector products that were last obtained are used to solve for the desired parameter.

21 Claims, 6 Drawing Sheets

INDIVIDUAL INTERACTION SHELLS OF EACH CUBE
BELONGING TO SIBLING COMBINATION

COMMON INTERACTION REGION FOR SIBLING COMBINATION FORMED BY
INTERSECTION OF INDIVIDUAL INTERACTION REGIONS OF CUBES BELONG
TO SIBLING COMBINATION

COMBINED FAST MULTIPOLE-QR COMPRESSION TECHNIQUE FOR SOLVING ELECTRICALLY SMALL TO LARGE STRUCTURES FOR BROADBAND APPLICATIONS

RELATED APPLICATIONS

This application is based on a prior copending provisional application, Ser. No. 60/807,462, filed on Jul. 14, 2006, the benefit of the filing date of which is hereby claimed under 35 U.S.C. §119(e).

GOVERNMENT RIGHTS

This invention was made with government support under Grant Nos. NNJ04HA45P and MODO2 awarded by the National Aeronautics and Space Administration (NASA). The government has certain rights in the invention.

BACKGROUND

Fast iterative algorithms are often used for solving Method of Moments (MoM) systems having a large number of unknowns, to determine current distribution and other parameters. The most commonly used fast methods include the fast multipole method (FMM), the precorrected fast Fourier transform (PFFT), and low-rank QR compression methods. These methods reduce the $O(N^2)$ memory and time requirements to $O(N \log N)$ by compressing the dense MoM system so as to exploit the physics of Green's function interactions.

FFT-based techniques for solving such problems are efficient for space-filling and uniform structures, but their performance substantially degrades for non-uniformly distributed structures, due to the inherent need to employ a uniform global grid. For solving arbitrarily-shaped structures, which is a typical requirement, FMM and QR techniques are better suited than FFT techniques. The FMM and QR approaches use oct-tree based geometric decomposition and employ multipole operators or Modified Gram-Schmidt (MGS) orthogonalization to compress interactions between far-field cube elements of the oct-tree representation. The fast multilevel algorithms have been used to solve the electric field integral equation (EFIE), magnetic field integral equation (MFIE) and combined field integral equation (CFIE).

However, neither the FMM technique nor the QR technique can be used at all frequencies. Specifically, in the FMM technique, the translation operator becomes near singular at low frequencies, producing unacceptably inaccurate results and making it inapplicable to electrically small structures, e.g., in modeling electronic packages and interconnects. In contrast, QR based methods become unusable at higher frequencies, because the QR compression scheme becomes inefficient for oscillating kernels. In addition, the QR technique is optimally usable with electrically small structures. A paper by D. Gope, S. Chakraborty, and V. Jandhyala entitled "A Fast Parasitic Extractor Based on Low-Rank Multilevel Matrix Compression for Conductor and Dielectric Modeling in Microelectronics and MEMS" presented at the June 2004 Design Automation Conference teaches combining the multilevel oct-tree structure that is common to FMM approaches, with the QR compression technique to achieve some optimization in solving for parasitic capacitance (DC), which is the type of solution for which the QR technique is suited. However, this approach cannot be used for solving a general broadband system that may have both large electrical structures operating at higher frequencies and small electrical structures operating at low frequencies. Using only QR techniques to solve such a system is impractical, because the processing time and effort becomes prohibitive when a relatively large system must be divided into an oct-tree structure comprising only such smaller portions.

There are other relative advantages and disadvantages for these methods. For example, the QR method has a higher setup time, but a lower matrix-vector product time, and can be easily parallelized, whereas FMM has a lower setup time, but has a higher matrix-vector product time. Also, the QR method is kernel independent, unlike FMM, which depends on the availability of analytic multipole operators. FMM is ideally suited for problems with fewer RHS vectors, while the QR method is better for systems with a larger number of RHS vectors. Thus, the QR method is best applied for achieving a solution for elements operating at low frequencies, while the FMM method is preferred for achieving a solution for elements operating at high frequencies.

Systems that include both electrically small elements operating at low frequencies and electrically large elements operating at higher frequencies are relatively common. Clearly, it would be desirable to develop an approach to solving such systems. The new approach should be a combination of these two methods, should be stable at all frequencies of the system, and be independent of the electrical size of the problem. Researchers have proposed a low-frequency FMM (LF-MLFMA), which removes the breakdown of the translator by renormalization of the FMM operators and can be used for treating electrically small structures, but this proposed technique does not provide the accuracy of the QR approach for low frequency and small electrical elements, because two different kinds of FMM operators are required and integration with the higher level FMM operators is difficult during translating from lower to higher levels. Accordingly, a better and more efficient approach is needed that retains the benefits and advantages of both the FMM and QR techniques, and which also provides for the interaction between FMM and QR elements in the solution that is achieved.

SUMMARY

Accordingly, one aspect of the present approach is directed to a machine-implemented method for efficiently solving for a desired parameter of a system or device that can include both electrically large elements operating at relatively higher frequencies, and electrically small elements operating at relatively lower frequencies. The method includes the step of setting up the system or device as a predefined structure that enables a solution for the desired parameter to be determined. The predefined structure including a plurality of elements, which may include electrically large elements, but not electrically small elements; electrically small elements, but not electrically large elements; or both electrically large elements and electrically small elements. An iterative solver is then executed to determine a first matrix vector product for any electrically large elements, and a second matrix vector product for any electrically small elements that are included in the system or device. The matrix vector products for the electrically large elements and the electrically small elements are logically combined, and a net delta for a combination of the matrix vector products is determined. Steps (b) and (c) are iteratively repeated as necessary, until a subsequent net delta has been determined that is within a predefined limit, as is common in iterative solvers. Once a subsequent net delta has been determined that is within the predefined limit, the matrix vector products that were last determined are employed to obtain a solution for the desired parameter. Finally, the solution for the desired parameter is presented to a user in a tangible form, for example, on a display.

In one exemplary embodiment, the step of setting up the system or device as a predefined structure includes the step of dividing the system or device into an oct-tree structure. Further, the step of dividing the system or device into an oct-tree structure comprises the steps of enclosing the system or device with a cube at a 0th level; splitting the cube at the 0th level into eight child cubes, forming cubes at a 1st level; recursively repeating the splitting process for cubes at successive levels until a desired number of levels are created; and for each cube that is thus formed, maintaining neighbor lists and interaction lists. The plurality of elements in this exemplary embodiment includes regions of the oct-tree structure having one or more cubes. The step of setting up further includes the step of determining whether each region of the oct-tree structure is an electrically large element or an electrically small element. The electrically large elements are of a fast multipole method (FMM) type, and the electrically small elements are of a QR type. The step of setting up the system or device can further include the step of setting up FMM operators for any of the elements that are of the FMM type, to enable the matrix vector products to be determined, and the step of setting up QR interactions for any of the elements that are of the QR type, to enable the matrix vector products for that type to be determined.

The step of setting up the FMM operators includes the step of forming aggregation and disaggregation operators.

The step of determining whether each region of the oct-tree structure is an electrically large element or an electrically small element includes determining that a level of the oct-tree structure is an FMM level if an electrical size of the cubes at that level is greater than a defined cutoff value. Similarly, the level of the oct-tree structure is determined to be of a QR level if the electrical size of the cubes at that level is not greater than the defined cutoff value.

Cubes of an FMM level interact via FMM operators, and for a QR level, contributions of an interaction list for the cubes of the QR level can be compressed. The step of determining a second matrix product can thus include the step of performing matrix-vector products using QR compressed interaction matrices.

Another aspect of the present approach is directed to a memory medium on which are stored machine readable and executable instructions. When executed these machine instructions cause a processor to carry out functions that are generally consistent with the steps of the method discussed above.

Yet another aspect of the present invention is directed to an apparatus for efficiently solving for a desired parameter of a system or device that can include both electrically large elements operating at relatively higher frequencies, and electrically small elements operating at relatively lower frequencies. The apparatus includes a memory for storing machine executable instructions, and a user interface that enables input and output. A processor is coupled to the memory and to the user interface, and the processor executes the machine executable instructions to carry out a plurality of functions that are generally consistent with the steps of the method discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIGS. 1A, 1B, and 1C respectively schematically illustrate levels 0, 1, and 2 for an oct-tree structure encompassing an electronic device or system;

DESCRIPTION

Figure 1A:
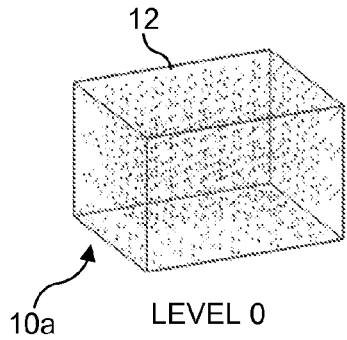

Figures and Disclosed Embodiments Are Not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Oct-Tree Spatial Decomposition Hierarchy

Figure 1B:
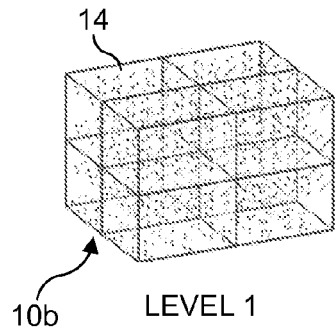
Figure 1C:
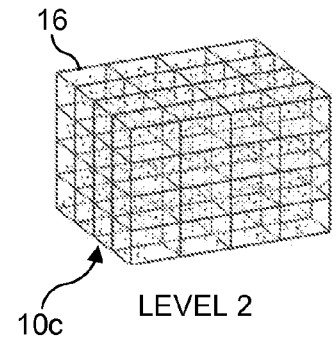

The present novel approach is based on maintaining a regular geometric pattern of cells. For three-dimensional (3-D) arbitrarily shaped geometries, the cell data structure is in the form of an oct-tree. (A cell corresponds to a cube of an oct-tree structure, as explained below.) The best combination, which yields a regular cell pattern, is a loosely bounded, spatially balanced decomposition into orthants. Empty cells are ignored in the pattern. A starting cell, $c_0^0$, is the smallest cube that encloses the entire geometry. The superscript applied to a cube indicates the level of decomposition to which the cube belongs, while the subscript denotes the cube number in that level. Each cell is recursively decomposed into a maximum of eight cubes in 3-D, as shown in the examples illustrated in FIGS. 1A, 1B, and 1C, depending on the distribution of basis functions. In FIG. 1A, at a level 0, an oct-tree structure 10a consists of a single cube 12, which corresponds to cube $c_0^0$, and in FIG. 1B, at a level 1, an oct-tree structure 10b consists of eight cubes 14, while in FIG. 1C, at a level 2, an oct-tree structure 10c consists of 64 cubes 16. Thus, each cube $c_i^l$, which is the $i^{th}$ cube at level l, is decomposed by spatially balanced splits along each coordinate, x, y, and z:

$$split_x = \frac{x_{max} + x_{min}}{2}; split_y = \frac{y_{max} + y_{min}}{2}; split_z = \frac{z_{max} + z_{min}}{2} \quad (1)$$

where $split_x$, $split_y$, and $split_z$ are the split positions in the three orthogonal directions, and $x_{max}$, $x_{min}$, $y_{max}$, $y_{min}$, $z_{max}$, and $z_{min}$ are the bounding coordinates of the cube.

Each cube $c_j^{l+1}$ resulting from this decomposition is called a child of $c_i^l$ and the latter is denoted as the parent of $c_j^{l+1}$;

$$P_{c_j^{l+1}} = c_i^l. \quad (2)$$

All the child cubes of $c_i^l$ are siblings of each other, where a sibling set is defined as:

$$S_{c_j^{l+1}} = \{c_k^{l+1} \text{"} k | P_{c_k^{l+1}} = P_{c_j^{l+1}}\}. \quad (3)$$

At each level, the generated cells are identical cubes, and the pattern repeats across levels.

Merged Interaction List

Figure 2A:
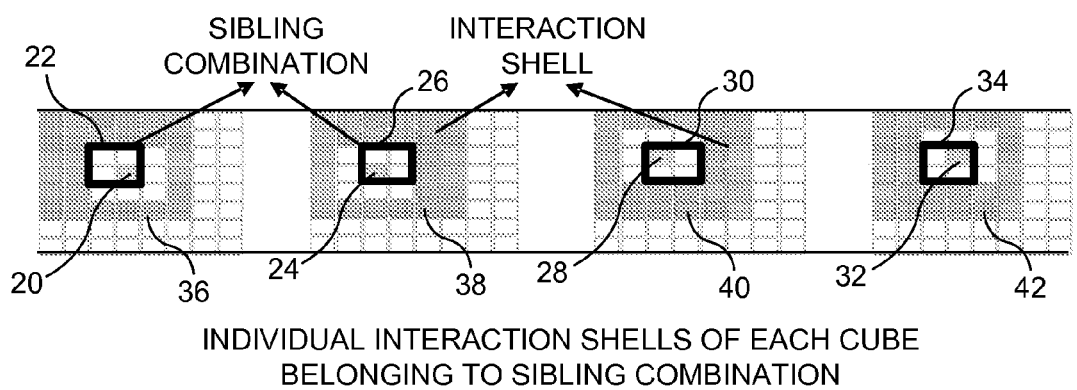
FIG. 2A is a simplified two-dimensional (2-D) schematic diagram illustrating an example of interaction shells for each cube belonging to a sibling combination.

FIG. 2A illustrates sibling combinations 22, 26, 30, and 34, for cubes 20, 24, 28, and 32, respectively. Also shown are interaction shells 36, 38, 40, and 42, for cubes 20, 24, 28, and 32, respectively. It is observed that the interaction lists of siblings share many common cubes:

$$I_S = \bigcap I_{c_i^l} \neq 0 \quad (4)$$

$$\text{"} i \mid c_i^l \hat{I} S_{c_j^l}.$$

The common cubes in the interaction lists of the siblings are denoted by $I_s$. For visualization purposes, the 2-D common interaction shells are illustrated in FIG. 2A, although the present exemplary approach is designed for 3-D geometries.

Figure 2B:
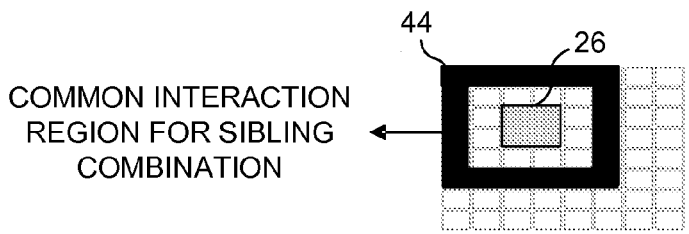
FIG. 2B is a simplified 2-D schematic diagram illustrating an example of a common intersection region for a sibling combination formed by intersection of individual interactions regions of cubes belonging to sibling combination.

It is therefore possible to group source cubes and observer cubes of different interaction lists in order to compress larger matrices to low epsilon-ranks and thereby, gain in terms of overall compressibility. It should be noted that the common interaction list does not directly translate into a merged interaction, because the epsilon-rank of such an interaction sub-matrix will not in general be low. The common interaction list is decomposed into disjointed parts, such that the overall compression is optimized. Each such disjointed part is an interaction between grouped source cubes and observer cubes and forms an entry of the MIL denoted as µ, as schematically illustrated by the example provided in FIG. 2A. An exemplary common interaction region 44 for sibling combination 26 is illustrated in FIG. 2B.

QR Algorithm and QR Compression of Matrices

The QR algorithm uses a predetermined matrix structure for arbitrary 3-D geometries that ensures efficient compression. Method of Moment (MoM) sub-matrices pertaining to interactions of the MIL are compressed by forming QRs from samples. Consider n source basis functions $f_i$ defined over domain $S_i$, for i=1, 2, ..., n, such that $S_i \in R_{src}$, where $R_{src}$ is the region of space inside an MIL entry source group. Similarly, consider m testing functions whose domains belong to region $R_{obs}$, which is delimited by the MIL entry observer group. Let the sub-matrix $\overline{Z}_{m \times n}^{sub}$ of the full MoM matrix $\overline{Z}$ represent the interactions between the basis and the testing functions through the designated Green's function $g(r,r')$.

Green's functions that are encountered in capacitance extraction problems, for example, including those for multi-layered dielectrics, vary smoothly with distance. Therefore, the column of $\overline{Z}^{sub}$ pertaining to the interaction of $f_i$ with all testing functions is closely related to other columns that capture similar interactions for $f_j \forall j | S_j$ in the neighborhood of $S_i$.

Using the Modified Gram-Schmidt (MGS), process and a user-specified tolerance $\epsilon$, $\overline{Z}^{sub}$ can be decomposed into a unitary matrix $\overline{Q}_{m \times r}$, and an upper triangular matrix $\overline{R}_{r \times n}$, such that:

$$\frac{\|\overline{Z}^{sub} - \overline{QR}\|}{\|\overline{Z}^{sub}\|} < \varepsilon \quad (5)$$

where:

$$\overline{Q}^H \overline{Q} = \overline{I} \quad (6)$$

and the matrix norm $\|\overline{X}\|$ is defined as the maximum singular value of the matrix $\overline{X}$.

The QR decomposition of $\overline{Z}^{sub}$, as shown above, requires the construction of the entire sub-matrix. With such a scheme, the setup time for an N×N MoM matrix will be $O(N^2)$. However, it is possible to construct the QR representation of the entire sub-matrix by just forming some selected rows and columns of the matrix. The procedure of obtaining the sampled rows $\overline{S}_r$ and sampled columns $\overline{S}_c$, for the given sub-matrix $\overline{Z}^{sub} | \overline{Z}^{sub} \in \{\overline{L}^{sub}, \overline{P}^{sub}\}$, is well known in the art.

Once the sampled rows and columns are formed, the following steps enable the representation of $\overline{Z}^{sub}$ as:

$$\overline{Z}_{m \times n}^{sub} = \overline{Q}_{m \times r} \overline{R}_{r \times n}. \quad (7)$$

First, $\overline{Q}_{m \times r}$ is formed by employing MGS decomposition on $\overline{S}_c$:

$$\overline{S}_{c_{m \times s}} = \overline{Q}_{m \times r} \overline{R}_{rs}' \quad (8)$$

where $\overline{Q}_{m \times r}$ is a unitary matrix, $\overline{R}_{r \times s}'$ is upper triangular, and s is the number of samples chosen (usually twice the MIL interaction epsilon-rank). Matrix $\tilde{Q}_{s \times r}$ is formed by taking rows of $\overline{Q}_{m \times r}$, such that the indices of those rows are the same as the ones used to construct $\overline{S}_r$ from $\overline{Z}^{sub}$. Under such conditions, the following is true:

$$\overline{S}_{r_{s \times n}} = \tilde{Q}_{s \times r} \overline{R}_{r \times n}. \quad (9)$$

To solve for $\overline{R}_{r \times n}$ from Eq. 7, $\tilde{Q}_{s \times r}$ is decomposed using MGS into a unitary matrix $\overline{Q}_{s \times r}'$ and an upper triangular square matrix $\tilde{\overline{R}}_{r \times r}$:

$$\tilde{Q}_{s \times r} = \overline{Q}_{s \times r}' \tilde{\overline{R}}_{r \times r}. \quad (10)$$

Using Eq. 8 and the properties of $\overline{Q}_{s \times r}'$, Eq. 7 can be written as:

$$\overline{Q}_{s \times r}'^T \overline{S}_{r_{s \times n}} = \tilde{\overline{R}}_{r \times r} \overline{R}_{r \times n}. \quad (11)$$

From Eq. (11), $\overline{R}_{r \times n}$ can be extracted by back-substitution, since $\tilde{\overline{R}}_{r \times r}$ is a square upper triangular matrix. In the real code samples of the rows and columns of MoM, sub matrices are used to construct the QR.

Multilevel Fast Multipole Algorithm (MLFMA)

The MLFMA is widely used for computing scattering from large electrical bodies by solving the EFIE using MoM. For a 3-D conducting structure, the EFIE can be obtained by considering the continuity of the tangential electric field at the surface S:

$$(E^s(J) + E^i)_{tan} = 0 \quad (12)$$

where $E^s$ is the scattered electric field, and $E^i$ is the incident electric field. The scattered field $E^s$ is given by the mixed potential expression:

$$E^s(J) = -\frac{j\omega\mu}{4\pi}\int_S G(r,r')J(r')dS' - \nabla\frac{1}{4\pi\omega\varepsilon}\int_S G(r,r')\nabla\cdot J(r')dS' \quad (13)$$

where $G(r,r')=e^{ik|r-r'|}/|r-r'|$ is the free-space Green's function. Substituting Eq. (13) into Eq. (12) yields the EFIE. Using triangular tessellations, RWG basis functions and Galerkin testing, a dense $N_e \times N_e$ system of equations is obtained, where $N_e$ is the number of RWG edges. The first step leading to the MLFMA is a hierarchical division of the given geometric structure or system into a multilevel oct-tree. The next step is to use the addition theorem to separate the interactions between the source and observer cubes.

Expressing the addition theorem in the spectral domain diagonalizes the interaction between the source and the observer cubes in the oct-tree, so that the matrix-vector product can be written in the following way:

$$\sum_{i=1}^{N_e} A_{ji}a_i = \sum_{m'\in B_m}\sum_{i\in G_{m'}} A_{ji}a_i + \frac{ik}{4\pi}\int d^2\hat{k} V_{mj}(\hat{k})\cdot\sum_{m'\notin B_m}\alpha_{mm'}(\hat{k}\cdot\hat{r}_{mm'})\sum_{i\in G_{m'}}V_{m'i}(\hat{k})a_i \quad (14)$$

for $j=1, 2 \ldots N_e$. Here, $B_m$ represents the neighbor and the self cubes, and thus, the first term represents the contribution from near-field cubes. The latter term represents the contribution from all other cubes, where $V_{m'i}(\hat{k})a_i$ is the "outgoing" plane wave at the m'-th cube, and $\alpha_{mm'}$ translates the "outgoing" plane waves into "incoming" plane waves and is given by:

$$\alpha_{mm'}(\hat{k}\cdot\hat{r}_{mm'}) = \sum_{l=0}^{L} i^l(2l+1)h_l^{(1)}(kr_{mm'})P_l(\hat{r}_{mm'}\cdot\hat{k}). \quad (15)$$

$V_{mj}(\hat{k})$ converts the incoming plane waves into electric fields at the m-th cube of the oct-tree. Eq. (15) can thus be used to construct the plane wave expansions to form the multipole operators at all levels.

Figure 3:
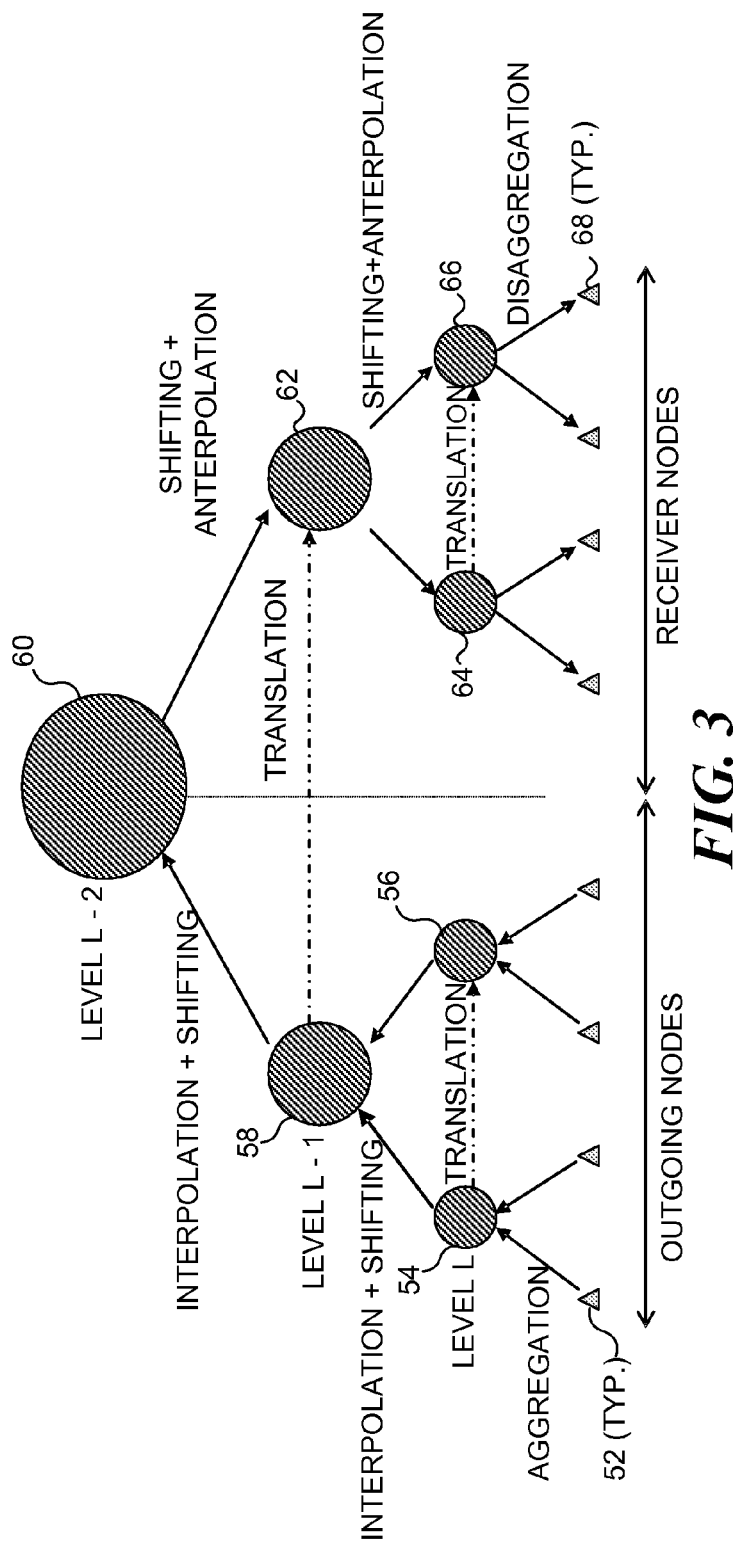
FIG. 3 is a schematic diagram illustrating exemplary operations in a combined MultiLevel Fast Multipole Algorithm (MLFMA)

Eq. (14) gives the single level FMM, which scales as $O(N^{1.5})$ The multilevel FMM algorithm uses three sweeps. In a first sweep, outgoing plane wave expansions are constructed at the lowest level. These expansions are then shifted and interpolated to the higher level cubes. In a second sweep, outgoing plane waves are translated to the receiver cubes and are then shifted and anterpolated to cubes at lower levels. In the last sweep, the incoming plane waves are converted into fields via local operators and contributions from neighboring boxes are directly computed. The net cost of MLFMA is reduced to O(N log N). FIG. 3 depicts the flow of the multipole operations in MLFMA. As shown therein, outgoing nodes 52 are aggregated to a level L, and translation occurs between aggregate nodes 54 and aggregate nodes 56. The aggregate nodes are interpolated and shifted to a level L-1, indicated by a reference number 58. Further interpolation and shifting leads to a level L-2, as indicated by a reference number 60. From level L-2, shifting and anterpolation lead to level L-1, as indicated by a reference number 62. Translation also occurs between elements on level L-1. Further shifting and anterpolation leads to elements 64 and 66, between which translation occurs. Receiver nodes 68 are produced by disaggregation of elements at Level L.

The QR-Based EFIE Algorithm

Figure 4:
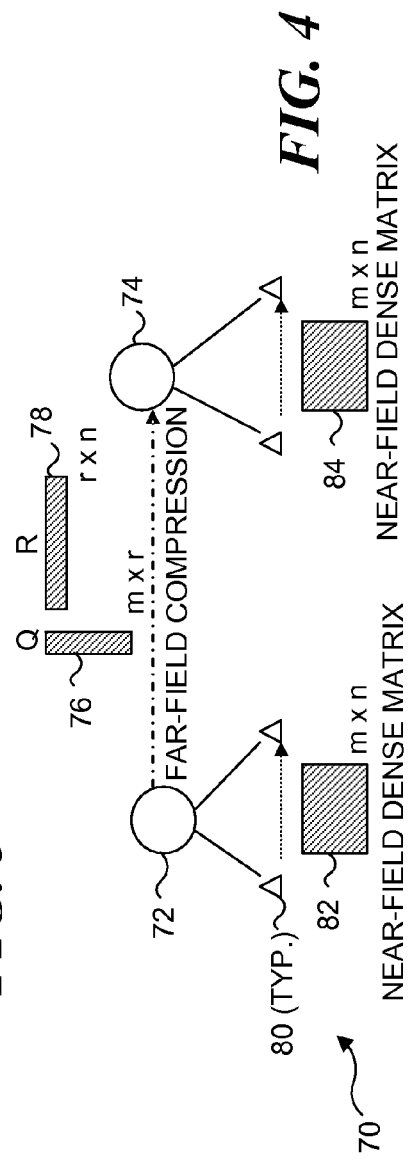
FIG. 4 is a schematic illustration of a matrix structure in a multilevel QR scheme.

The MLFMA breaks down for small electrical structures because, from Eq. (15), it will be apparent that the spherical Hankel function becomes almost singular when the oct-tree cube size is smaller than one-fifth of the wavelength of the frequency of the electrical signal. For such structures, QR-based methods can be used, because the integral kernel is smooth, and far-field interactions can be efficiently compressed using QR. FIG. 4 includes a schematic diagram 70 that illustrates the matrix structure in the multilevel QR scheme, where far-field compression occurs between far field interaction cubes 72 and 74. In the QR scheme, an orthogonal matrix 76 (i.e., an m×r Q matrix), and an upper triangular matrix 78 (i.e., an r×n R matrix) are used to obtain a solution. In this Figure, blocks 82 and 84 represent near-field matrices that are used for determining near-field interactions between near-field neighbor cubes 80. FIG. 4 relates to the following discussion.

The setup cost for this method is $O(N^2)$ if a conventional MGS technique is used to perform the QR factorization. Another method suggested in the literature uses sampled rows and columns for reducing the setup cost to O(N log N). An EFIE algorithm employed in one exemplary embodiment uses this sampled rows and columns method for low frequencies and is described as follows.

The algorithm has the following key steps:

Oct-tree decomposition The given 3-D geometry is hierarchically divided into an oct-tree structure similar to that of the MLFMA, and the interaction regions are separated into near-field neighbor cubes and far-field interaction cubes in the oct-tree structure.

Formation of Merged Interaction List (MIL) In each interaction list, the siblings share common interaction regions. This pattern is exploited in this approach by grouping source sibling cubes and common interaction region observer cubes, which leads to low epsilon-rank QR factorization of larger matrices, resulting in an enhanced overall compressibility. A set of MILs is maintained for each level of the oct-tree. The MIL pattern for a given sibling combination is the same as that of a different sibling combination at the same level. The MIL pattern is also repeated across levels. It has been suggested that forming the MIL from among five types of sibling combinations leads to an overall rank reduction.

QR compression using sampled rows and columns The far-field interaction is compressed using sampled rows and columns of the full interaction matrix. The number of samples required is typically twice the expected rank, and the complexity of the algorithm is O((m+n)r), where m and n are the number of rows and columns of the full interaction matrix, and r is the rank. This technique is an improvement over the O(mnr) nature of the conventional MGS algorithm and as a result, the overall setup time scales as O(N log N).

Matrix-vector product Once the setup is completed, the interactions can be directly computed using the compressed matrices, and hence, tree traversal is not required. Thus, the matrix-vector product step is not sequential, as in the case in MLFMA, and this step is therefore easier to parallelize. The time required to compute the matrix-vector product tends to be less than to carry out the FMM process, although the setup time is longer, which makes this approach applicable to problems with large number of Right Hand Side (RHS) vectors, where matrix-vector products dominate the overall time to achieve a solution.

The performance of QR compression degrades as frequency is increased leading to more oscillations of the kernel involved, making it necessary to hybridize the two algorithms in order to be applicable at all frequencies.

FMM-QR Technique

Figure 7:
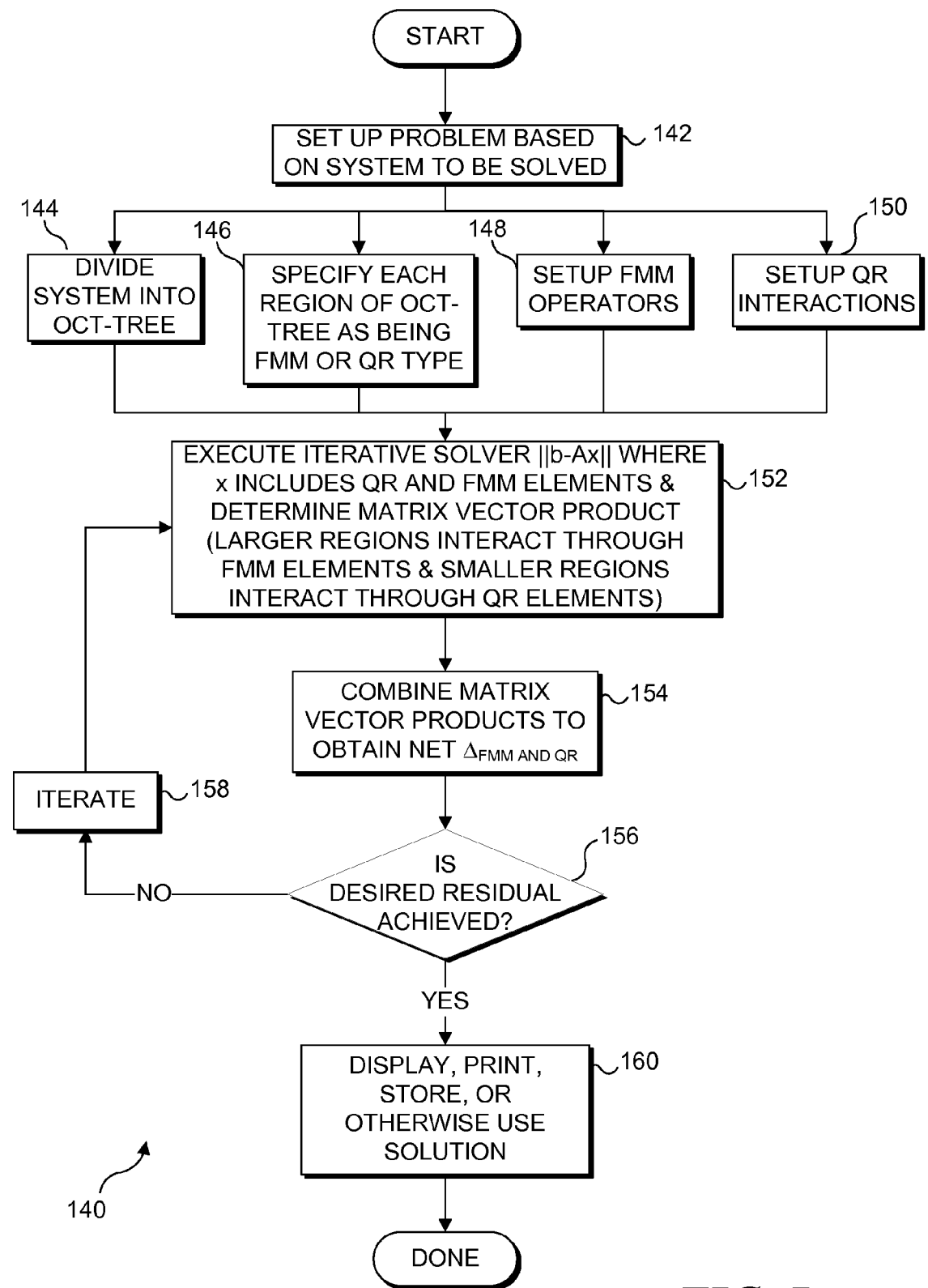
FIG. 7 is a flow chart showing the logical steps employed in an exemplary embodiment of the combined FMM-QR solution discussed herein.

An exemplary FMM-QR technique is based on the following points. Both MLFMA and the present exemplary approach use the same oct-tree structure for decomposing a 3-D computational domain or system. These two methods work for different oct-tree cube sizes. For cube sizes smaller than one-fifth of the wavelength of the signal frequency, QR compression can be used, whereas FMM operators can be used to compute the interactions for larger oct-tree cube sizes. Thus, it is apparent that at the lower levels of the oct-tree structure, the interactions can be QR compressed, while at higher levels, multipole FMM operators can be used for computing the far-field. The exemplary technique is described below and in connection with a flowchart of exemplary steps illustrated in FIG. 7. A first step 142 is broadly directed at setting up the problem, based on the system or device to be solved. This step actually includes four substeps 144, 146, 148, and 150, which are described as follows.

Oct-tree Decomposition The 3-D computational domain is broken down into a hierarchical oct-tree structure in step 144. A $0^{th}$ level starting cube is created by enclosing the given geometry (i.e., the domain, device, or system) with a cube, which is split into eight child cubes, forming the $1^{st}$ level. This splitting process is repeated recursively until L levels are generated, depending on the problem size. Let $(ka)_l$ denote the electrical size of a cube at level l, where $k=2\pi/$wavelength and $\alpha=$cube_size. For each cube, neighbor lists and interaction lists are maintained. This step is generally identical to the step of forming an oct-tree structure in the MLFMA technique.

Decide whether each level is FMM or QR Step 146 is very important in the exemplary embodiment of this novel technique. For each level l, the approach employed must automatically decide whether the level is an "FMM" or a "QR" level. If $(ka)_l>$cutoff, then l is an FMM level, otherwise it is a QR level. If a level l is a QR level, then the contributions of the interaction list can be compressed using a known scheme described in the art. Otherwise, the cubes at level l interact via FMM operators. Generally, the cutoff size is chosen to be in the range between about 0.1 and about 0.2, since above a size of about 0.2, FMM translators become singular. Let $j_{FMM}$ denote the finest FMM level, which will be much larger than the largest QR level.

Setup FMM operators (in step 148) and QR interactions (in step 150)

For level $i=j_{FMM}$ to 2:
Step 148 provides for the setup of multilevel FMM operators, as is known in the art, i.e.,
(i) If $i=j_{MM}$, form the aggregation and disaggregation operators.
(ii) For all FMM levels compute the shift, translation and interpolation operators.
Step 150 provides for the setup of the QR interactions.
For level i=L to $j_{FMM}$+1:
Form merged interaction list and perform QR compression.
Finally, at level L, compute the near-field contributions directly.

Depending on the electrical size of the problem, there can be three cases—no FMM levels (i.e., all QR levels), no QR levels (i.e., all FMM levels), and both FMM and QR levels, which is the more general case. Thus, all operators are free of breakdown and at the same time, efficient compression is achieved at the lower levels. Since the number of operations is bounded by O(N log N) for the oct-tree approach that is used for FMM, the net setup cost is also O(N log N) in this exemplary embodiment.

Matrix-vector product A step 152 provides for executing an iterative solver ‖b-Ax‖, where x includes QR and FMM elements. This step further includes the following:

For level $i=j_{FMM}$ to 2
Perform multilevel FMM matrix-vector products as in the MLFMA.
End
For level i=L to $j_{FMM}$+1
Perform matrix-vector products using QR compressed interaction matrices.
End
At level L compute the near-field matrix-vector products.

A step 154 combines the matrix vector products that have thus been determined to obtain a Net $\Delta_{FMM\ AND\ QR}$. A decision step 156 then determines if the desired residual has thus been obtained, i.e., is this result equal to or less than some predefined maximum value. If not, a step 158 provides for iterating the step 152 and 154 to determine a new Net $\Delta_{FMM\ AND\ QR}$. After sufficient iterations have produced a result that satisfies decision step 156, the process continues with a step 160, which provides for some tangible use of the result. Thus, the result may be stored on a hard drive, displayed to a user on a display device, or otherwise used in some physical and tangible manner.

Again, all of the involved steps in the matrix-vector products take O(N log N) operations, preserving the linear nature of the matrix-vector product. Notice, that in the FMM levels, there is a tree ascent step and a tree descent step during the step of determining the matrix-vector product. However, in the QR levels, there is no tree traversal during the step of determining the matrix-vector product, since each interaction is compressed separately, and thus, there is no interaction between levels.

Figure 5:
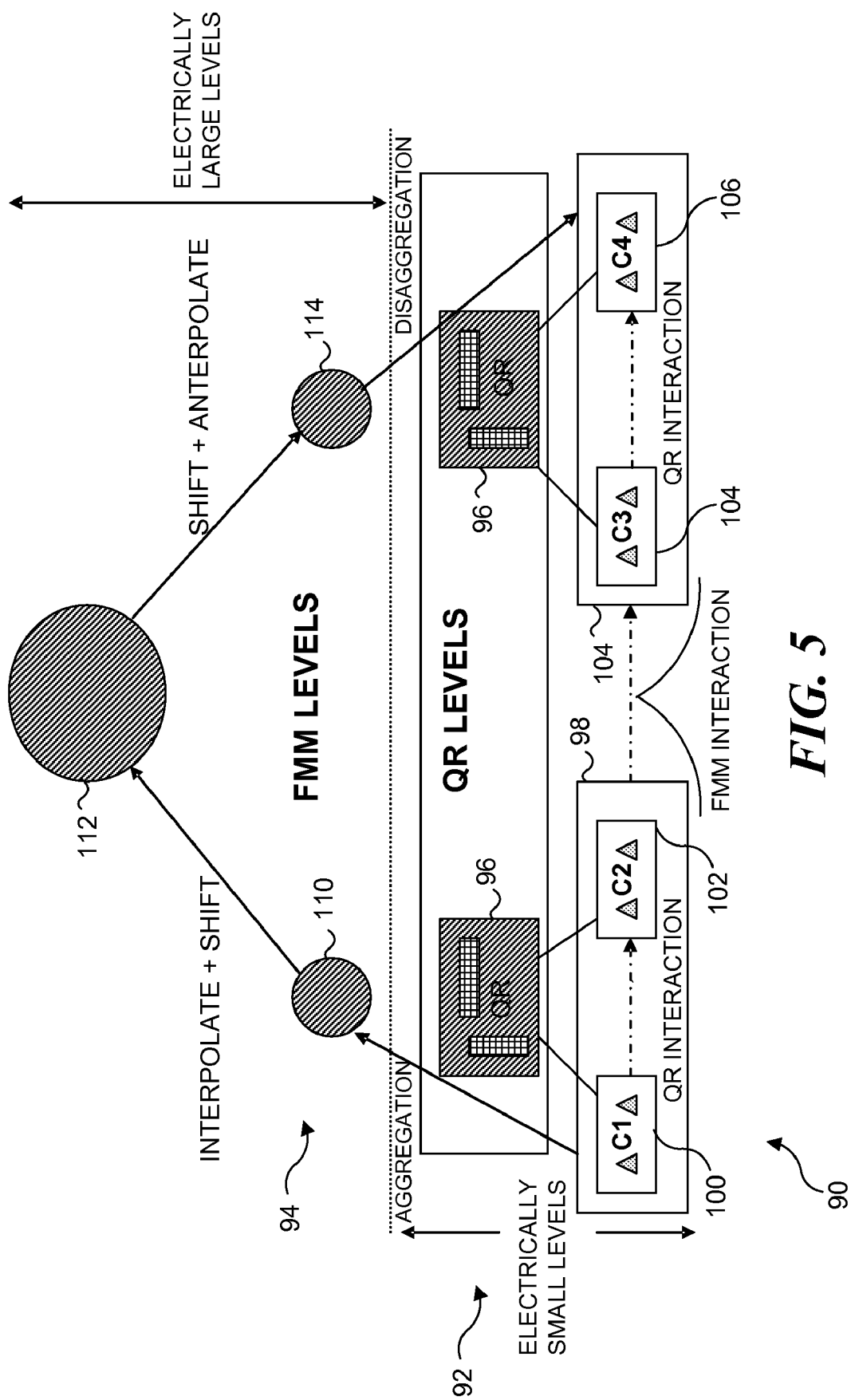
FIG. 5 is an exemplary schematic illustration of the novel approach for a combined FMM and QR solution of an electronic device or system.

The approach presented in the above algorithm is depicted in a schematic diagram 90 shown in FIG. 5, where C1, C2, C3, and C4 are lower level boxes 100, 102, 104, and 106 and belong to a QR level 92 (i.e., electrically small levels), and C1∪C2 and C3∪C4 are parent boxes 98 and 104, respectively, belonging to an FMM level 94 (i.e., electrically large levels). Consequently, at the lower level, the interaction between C1 and C2 is computed via a QR method 96; similarly, C3 and C4 interact via a QR method 96. In contrast, the higher level cubes of the oct-tree, C1∪C2 and C3∪C4, interact via the MLFMA operations as elements 110, 112, and 114, as discussed above in connection with FIG. 3.

In this exemplary embodiment, the desired parameter to be determined as the solution to the problem is the current density of a system or device. To compute the current density, the iterative solver determines the current densities from the matrix-vector products (by treating each matrix-vector product as a black box) and then iteratively computes the next approximation. The following steps are used to compute the current density:

1. $Z_{FMM\_QR} \cdot J_{unknown} = RHS_{Excitaion}$
2. Determine the next best approximation J+ΔJ using the GMRES iterative solver, as is well known in the art.
3. Residual=‖$Z_{FMM\_QR} \cdot J_{new}$–RHS‖/‖RHS‖.

If residual is within a predefined limit, then stop iterating (current density is equal to $J_{new}$ as last determined).
Else repeat steps 1-3.

It is expected that the present approach can also be used to determine a solution for other desired parameters of a system or a device. For example, this approach should also be useful in solving for desired parameters of a system or device, such as the radiated electric fields, the radar cross section of scatterers, and the reflection pattern due to impedance mismatch in circuits, to name only a few.

Numerical Results

The FMM-QR EFIE algorithm was implemented in the C programming language and was tested on a Linux machine in an exemplary embodiment; however, the language and operating system used to implement are not limited to these two choices. Many different programming languages, and other operating systems, such as Microsoft Corporation's WINDOWS™, can be used instead. The memory-time scaling of the tested algorithm is given in the following Table. The electrical size of the tested object was fixed at ka=1 and the number of patches were increased in this evaluation. With the increase in the number of levels, QR compression was used at lower levels. The number of FMM levels is not increased after cube size drops below the threshold. The overall method scaled almost linearly with time and the memory available on the computing system used to implement the task.

1)

TABLE

Exemplary Evaluation (for ka = 1)

| N | Time (sec) | Memory (GB) | # Levels | # FMM Levels | # QR Levels |
|---|---|---|---|---|---|
| 7500 | 1.7 | 0.174 | 3 | 3 | 0 |
| 9750 | 3.16 | 0.32 | 4 | 3 | 1 |
| 16500 | 6.29 | 0.674 | 4 | 3 | 1 |
| 31500 | 12.05 | 1.16 | 5 | 3 | 2 |
| 45000 | 18.5 | 1.7 | 5 | 3 | 2 |
| 75000 | 29.3 | 2.6 | 6 | 3 | 3 |

Figure 6A:
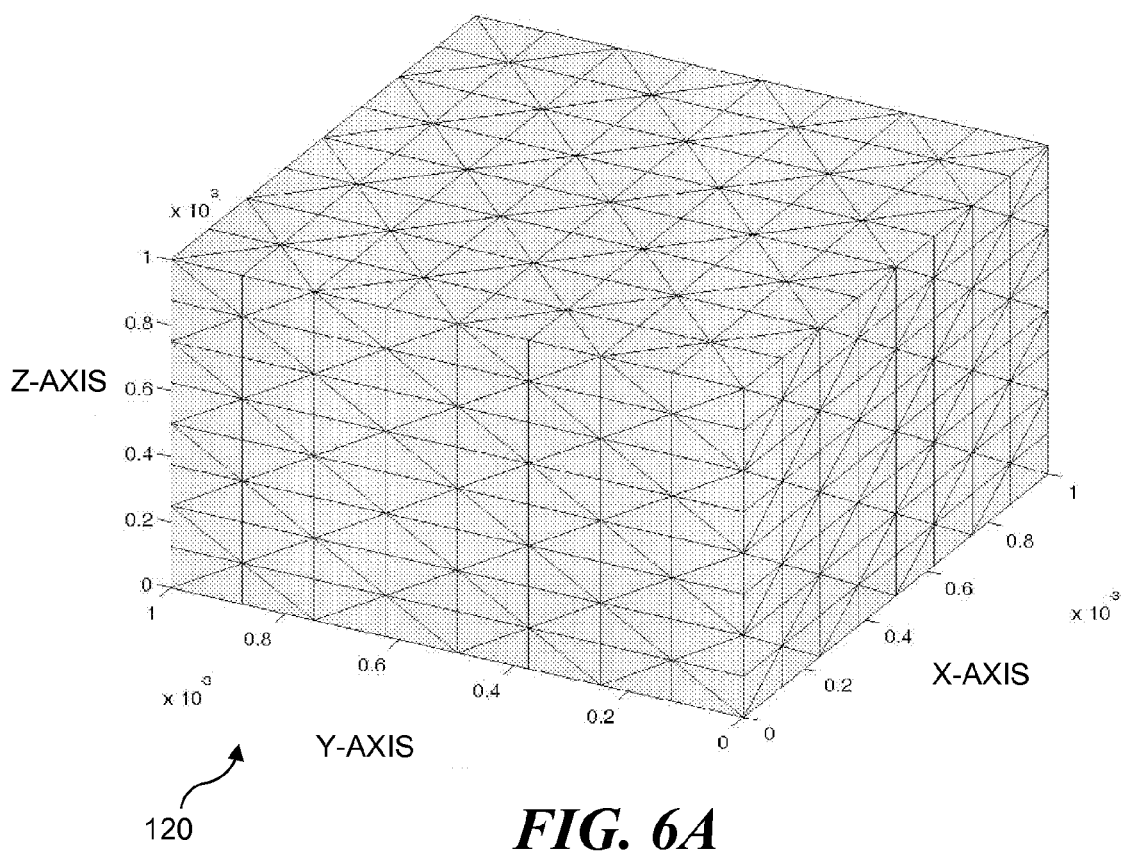
FIG. 6A is an exemplary illustration of the bistatic Radar Cross Section (RCS) of a cube structure.
Figure 6B:
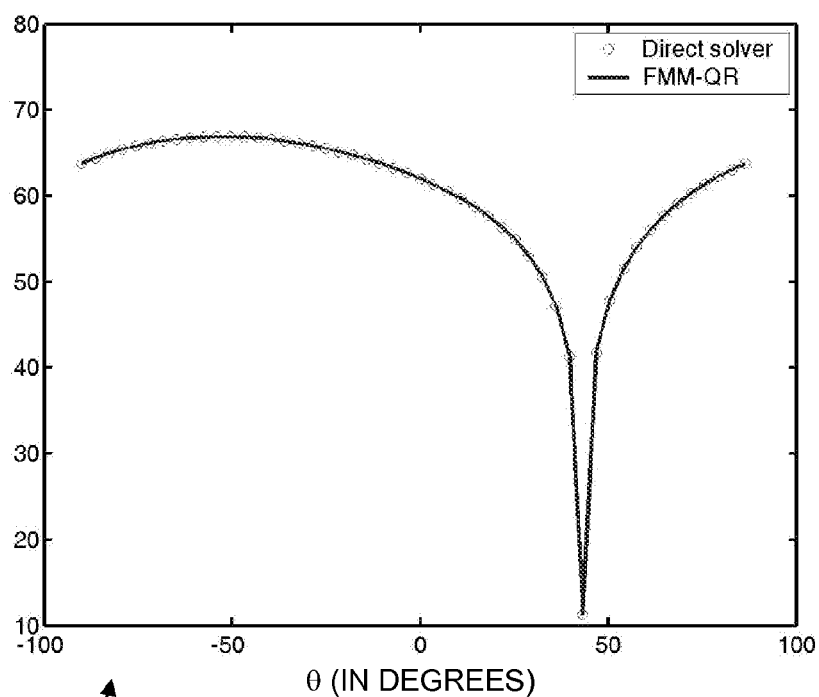
FIG. 6B is an exemplary graph illustrating a comparison between the RCS obtained using a direct solver and the present combined FMM-QR approach.

The EFIE code was used to find the Radar Cross Section (RCS) of a cube structure 120 at 40 GHz, as shown in FIG. 6A. Cube structure 120 was discretized with 6800 edges and was excited by a plane wave. FIG. 6B shows a comparison between the RCS obtained using the fast solver and a direct solver, demonstrating the usability of the code at high frequency.

Advantages of This Solution That Combines FMM-QR Elements

There are several advantages for using the present combined FMM-QR approach to solve a system. These advantages include the ease with which it is implemented. Since this approach is a hybrid method that uses the same oct-tree structure as employed for MLFMA, it can be integrated using existing programming code, and it is unnecessary to separately implement the LF-MLFMA operators. This process is easy to implement. Since this approach uses a hybrid algorithm having the same oct-tree structure as the LF-MLFMA technique, it can be integrated using existing software code. For example, it is unnecessary to implement the LF-MLFMA operators separately. This approach is stable and can be used for structures that require variable meshing for finer and coarser regions. Current distributions for the whole structure can be performed using the same code at all frequencies.

Exemplary Computing Device for Carrying Out Combined FMM-QR Solution

Figure 8:
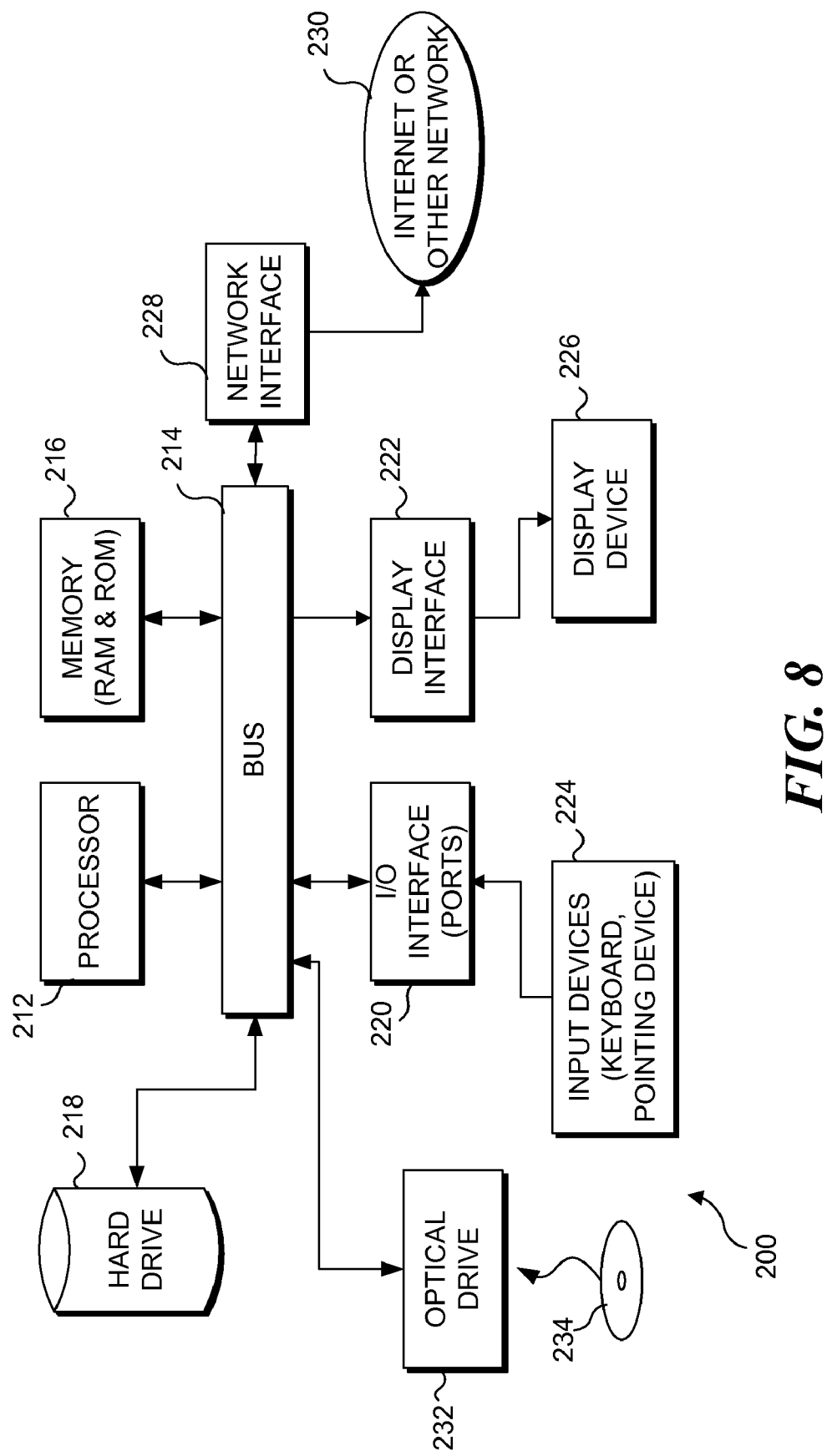
FIG. 8 is a functional block diagram of an exemplary computing device, suitable for use in carrying out the functions steps of the present combined FMM-QR solution.

FIG. 8 illustrates details of a functional block diagram for a computing device 200. The computing device can be a typical personal computer, but can take other forms. A processor 212 is employed for executing machine instructions that are stored in a memory 216. The machine instructions may be transferred to memory 216 from a data store 218 over a generally conventional bus 214, or may be provided on some other form of memory media, such as a digital versatile disk (DVD), a compact disk read only memory (CD-ROM), or other non-volatile memory device. An example of such a memory medium is illustrated by a CD-ROM 234. Processor 212, memory 216, and data store 218, which may be one or more hard drive disks or other non-volatile memory, are all connected in communication with each other via bus 214. Also connected to the bus are a network interface 228, an input/output interface 220 (which may include one or more data ports such as a serial port, a universal serial bus (USB) port, a Firewire (IEEE 1394) port, a parallel port, a personal system/2 (PS/2) port, etc.), and a display interface or adaptor 222. Any one or more of a number of different input devices 224 such as a keyboard, mouse or other pointing device, trackball, touch screen input, etc., are connected to I/O interface 220. A monitor or other display device 226 is coupled to display interface 222, so that a user can view graphics and text produced by the computing system as a result of executing the machine instructions, which may comprise both an operating system and applications being executed by the computing system, enabling a user to interact with the computing system. An optical drive 232 can be included for reading (and optionally writing to) CD-ROM 234, or some other form of optical memory medium. The machine instructions that are executed by processor 212 can cause the processor to carry out the steps of the method discussed above for determining a combined FMM-QR solution for an electronic device or system and then can store or display the results of that determination to a user, or can employ the results as an intermediate input to carry out still further processing that produces other tangible and/or physical results.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A machine-implemented method for efficiently solving for a desired parameter of a system or device that includes either or both electrically large elements operating at relatively higher frequencies, and electrically small elements operating at relatively lower frequencies, comprising the steps of:
   (a) setting up the system or device as a predefined structure that enables a solution for the desired parameter to be determined, the predefined structure including a plurality of elements, wherein the plurality of elements include:
      (i) electrically large elements, but not electrically small elements; or
      (ii) electrically small elements, but not electrically large elements; or
      (iii) both electrically large elements and electrically small elements;

(b) executing an iterative solver that determines a first matrix vector product for any electrically large elements, and a second matrix vector product for any electrically small elements that are included in the system or device;

(c) logically combining the matrix vector products for the electrically large elements and the electrically small elements, and determining a net delta for a combination of the matrix vector products;

(d) iteratively repeating steps (b) and (c) as necessary, until a subsequent net delta has been determined that is within a predefined limit;

(f) once a subsequent net delta has been determined that is within the predefined limit, employing said matrix vector products that were last determined to obtain a solution for the desired parameter; and (g) presenting the solution for the desired parameter to a user in a tangible form.

2. The method of claim 1, wherein the step of setting up the system or device as a predefined structure comprises the step of dividing the system or device into an oct-tree structure.

3. The method of claim 2, wherein the step of dividing the system or device into an oct-tree structure comprises the steps of:

(a) enclosing the system or device with a cube at an 0th level;

(b) splitting the cube at the 0th level into eight child cubes, forming cubes at a 1st level;

(c) recursively repeating the splitting process for cubes at successive levels until a desired number of levels are created; and (d) for each cube thus formed, maintaining neighbor lists and interaction lists.

4. The method of claim 3, wherein the plurality of elements comprises regions of the oct-tree structure that include one or more cubes, the step of setting up further comprising the step of determining whether each region of the oct-tree structure is an electrically large element or an electrically small element, the electrically large elements being of a fast multipole method (FMM) type, and the electrically small elements being of a QR type.

5. The method of claim 4, wherein the step of setting up the system or device further comprises the step of setting up FMM operators for any of the elements that are of the FMM type, to enable the matrix vector products to be determined.

6. The method of claim 5, wherein the step of setting up the system or device further comprises the step of setting up QR interactions for any of the elements that are of the QR type, to enable the matrix vector products to be determined.

7. The method of claim 5, wherein the step of setting up the FMM operators comprises the step of forming aggregation and disaggregation operators.

8. The method of claim 4, wherein the step of determining whether each region of the oct-tree structure is an electrically large element or an electrically small element comprises the step of determining that a level of the oct-tree structure is an FMM level if an electrical size of the cubes at said level is greater than a defined cutoff value, and that the level of the oct-tree structure is a QR level if the electrical size of the cubes at said level is not greater than the defined cutoff value.

9. The method of claim 8, wherein cubes of an FMM level interact via FMM operators, and for a QR level, contributions of an interaction list for the cubes of the QR level can be compressed.

10. The method of claim 3, wherein the step of determining a second matrix product comprises the step of performing matrix-vector products using QR compressed interaction matrices.

11. A non-transitory memory medium on which machine readable and executable instructions are stored, for carrying out the steps of claim 1.

12. Apparatus for efficiently solving for a desired parameter of a system or device that includes either or both electrically large elements operating at relatively higher frequencies, and electrically small elements operating at relatively lower frequencies, comprising:

(a) a memory for storing machine executable instructions;

(b) a user interface that enables input and output; and (c) a processor that is coupled to the memory and to the user interface, the processor executing the machine executable instructions to carry out a plurality of functions, including:

(i) setting up the system or device as a predefined structure that enables a solution for the desired parameter to be determined, the predefined structure including a plurality of elements, wherein the plurality of elements include:

(1) electrically large elements, but not electrically small elements; or (2) electrically small elements, but not electrically large elements; or (3) both electrically large elements and electrically small elements;

(ii) executing an iterative solver that determines a first matrix vector product for any electrically large elements, and a second matrix vector product for any electrically small elements that are included in the system or device;

(iii) logically combining the matrix vector products for the electrically large elements and the electrically small elements, and determining a net delta for a combination of the matrix vector products;

(iv) iteratively repeating steps (b) and (c) as necessary, until a subsequent net delta has been determined that is within a predefined limit;

(v) once a subsequent net delta has been determined that is within the predefined limit, employing said matrix vector products that were last determined to obtain a solution for the desired parameter; and (vi) presenting the solution for the desired parameter to a user in a tangible form.

13. The apparatus of claim 12, wherein the machine executable instructions cause the processor to divide the system or device into an oct-tree structure.

14. The apparatus of claim 13, wherein the machine executable instructions cause the processor to divide the system or device into the oct-tree structure by:

(a) enclosing the system or device with a cube at a 0th level;

(b) splitting the cube at the 0th level into eight child cubes, forming cubes at a 1st level;

(c) recursively repeating the splitting process for cubes at successive levels until a desired number of levels are created; and (d) for each cube thus formed, maintaining neighbor lists and interaction lists.

15. The apparatus of claim 14, wherein the plurality of elements comprises regions of the oct-tree structure that include one or more cubes, and wherein the machine executable instructions further cause the processor to determining whether each region of the oct-tree structure is an electrically large element or an electrically small element, the electrically large elements being of a fast multipole method (FMM) type, and the electrically small elements being of a QR type.

16. The apparatus of claim 15, wherein the machine executable instructions cause the processor to setup FMM operators for any of the elements that are of the FMM type, to enable the matrix vector products to be determined.

17. The apparatus of claim 16, wherein the machine executable instructions cause the processor to setup QR interactions for any of the elements that are of the QR type, to enable the matrix vector products to be determined.

18. The apparatus of claim 16, wherein the machine executable instructions cause the processor to form aggregation and disaggregation operators.

19. The apparatus of claim 15, wherein the machine executable instructions cause the processor to determine whether each region of the oct-tree structure is an electrically large element or an electrically small element by determining that a level of the oct-tree structure is an FMM level if an electrical size of the cubes at said level are greater than a defined cutoff value, and that the level of the oct-tree structure is a QR level if the electrical size of the cubes at said level are not greater than the defined cutoff value.

20. The apparatus of claim 19, wherein cubes of an FMM level interact via FMM operators, and for a QR level, contributions of an interaction list for the cubes of the QR level can be compressed.

21. The apparatus of claim 14, wherein the machine executable instructions cause the processor to determine a second matrix vector product by performing matrix-vector products using QR compressed interaction matrices.

* * * * *